United States Patent
Matsuda et al.

(10) Patent No.: US 12,326,835 B2
(45) Date of Patent: Jun. 10, 2025

(54) FILE MANAGEMENT SYSTEM AND WORK SUPPORT SYSTEM

(71) Applicant: Hitachi, Ltd., Tokyo (JP)

(72) Inventors: Takahiro Matsuda, Tokyo (JP); Shoji Yamamoto, Tokyo (JP); Shingo Hayashi, Tokyo (JP); Takuya Nakamichi, Tokyo (JP); Takaaki Ueno, Tokyo (JP); Masahiko Niioka, Tokyo (JP); Tomoki Tachikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/591,078

(22) Filed: Feb. 29, 2024

(65) Prior Publication Data
US 2024/0403266 A1    Dec. 5, 2024

(30) Foreign Application Priority Data

Jun. 1, 2023  (JP) ................. 2023-090661

(51) Int. Cl.
*G06F 16/00*  (2019.01)
*G06F 16/16*  (2019.01)
*G06F 40/279* (2020.01)

(52) U.S. Cl.
CPC ............ *G06F 16/16* (2019.01); *G06F 40/279* (2020.01)

(58) Field of Classification Search
None
See application file for complete search history.

(56) References Cited

U.S. PATENT DOCUMENTS

| | | | | |
|---|---|---|---|---|
| 9,152,632 B2 * | 10/2015 | Smith | ............. | G06F 16/152 |
| 9,275,020 B2 * | 3/2016 | Horiuchi | ............. | G06F 8/71 |
| 10,019,441 B2 * | 7/2018 | Massand | ............. | G06F 16/93 |
| 2010/0198864 A1 * | 8/2010 | Ravid | ............. | G06F 40/194 |
| | | | | 707/769 |
| 2012/0239761 A1 * | 9/2012 | Linner | ............. | G06F 40/279 |
| | | | | 709/206 |

FOREIGN PATENT DOCUMENTS

JP      2011-158929 A     8/2011

* cited by examiner

*Primary Examiner* — Anhtai V Tran
(74) *Attorney, Agent, or Firm* — MATTINGLY & MALUR, PC

(57) ABSTRACT

Provided is a technique capable of setting an appropriate link destination when there are a plurality of link destination candidates among data files. A file management system according to the present invention determines a type of a target indicated by a character string described in a data file to determine whether the target matches among data files and assigns a link among the data files when the target matches.

15 Claims, 22 Drawing Sheets

| WORK SUPPORT SYSTEM | |
|---|---|
| REGISTER DOCUMENT FILE | |
| [SELECT FILE]   [UPLOAD] | |
| DEVELOPED CONNECTION DIAGRAM_A11. pdf | ALREADY UPLOADED |
| DEVELOPED CONNECTION DIAGRAM_B11. pdf | BEING SELECTED |
| WIRING TABLE_A11. pdf | BEING SELECTED |
| MOUNTING DIAGRAM_A11. pdf | BEING SELECTED |

FIG. 4B

| # | WIRING NUMBER | FIRST END WIRING DESTINATION | | | SECOND END WIRING DESTINATION | | |
|---|---|---|---|---|---|---|---|
| | | DRAWING NUMBER | DEVICE NUMBER | TERMI-NAL | DRAWING NUMBER | DEVICE NUMBER | TERMI-NAL |
| 1 | 5APE01 | PE01 | SW01PE01 | 7 | PE01 | SW02PE01 | 2 |
| 2 | 5BPE01 | PE01 | SW01PE01 | 6 | PG03 | AD03PG03 | 4 |
| 3 | PD032A | PD03 | SW01PD03 | 7 | PE01 | SW01PE01 | 2 |
| 4 | PD032B | PD03 | SW01PD03 | 6 | PE01 | SW01PE01 | 3 |

WIRING TABLE

| PANEL NUMBER | HT02 |
|---|---|
| | WIRING TABLE |
| | 2 |

*FIG. 4D*

| PANEL | #HT02 | |
|---|---|---|
| TERMINAL BLOCK | T1 | T2 |

| | | |
|---|---|---|
| PD032A — 8 — HT02CF01D1 | 5APE01 — 8 — HT02CF02D1 | |
| PD032A — 7 — HT02CF01D2 | 5BPE01 — 7 — HT02CF02D2 | |
| 6 — HT02CE01D1 | 6 | |
| 5 — HT02CE01D2 | 5 | |
| 4 | 4 | |
| 3 | 3 | |
| 2 | 2 | |
| 1 | 1 | |

| | | #HT02 |
|---|---|---|
| | 2022-02-01 | TERMINAL BLOCK CONNECTION DIAGRAM |
| | | 425HTL2011  2 |

FIG. 6

| CHARACTER STRING TYPE | TYPE OF INDICATED TARGET | FEATURE | EXAMPLE |
|---|---|---|---|
| PANEL NUMBER | CONTROL PANEL | DESCRIBED IN MOUNTING DIAGRAM | HT02 |
| DRAWING NUMBER | PAGE OF DEVELOPED CONNECTION DIAGRAM | DESCRIBED IN TITLE COLUMN OF DEVELOPED CONNECTION DIAGRAM | PE01 |
| DEVICE NUMBER | DEVICE | INCLUDING DRAWING NUMBER | SW01PE01 |
| INTERNAL WIRING NUMBER | INTERNAL WIRING | INCLUDING DRAWING NUMBER | PD032A, 5APE01 |
| EXTERNAL WIRING NUMBER | EXTERNAL WIRING | INCLUDING PANEL NUMBER | HT02CE01D1 |

FIG. 7

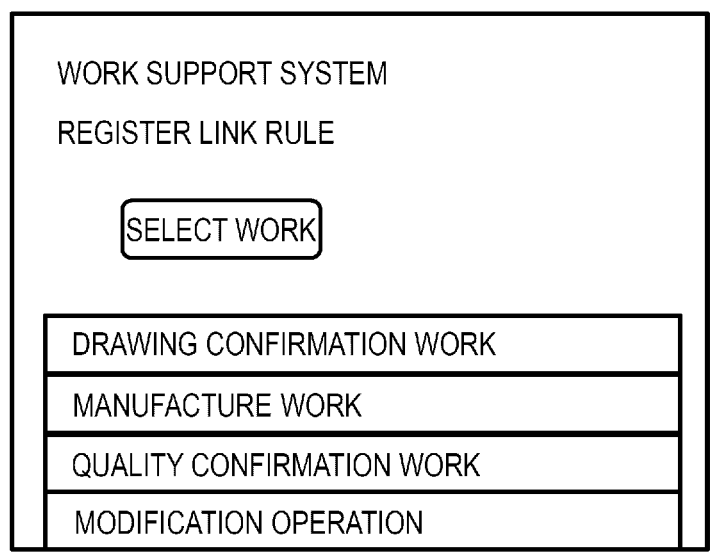

FIG. 8A

| No. | LINK SOURCE DRAWING TYPE | CHARACTER STRING INDICATION TARGET TYPE | LINK DESTINATION DRAWING TYPE | PRIORITY |
|---|---|---|---|---|
| 1 | DEVELOPED CONNECTION DIAGRAM | INTERNAL WIRING NUMBER | WIRING TABLE | 1 |
| 2 | | | TERMINAL BLOCK CONNECTION DIAGRAM | 2 |
| 3 | | EXTERNAL WIRING NUMBER | TERMINAL BLOCK CONNECTION DIAGRAM | 1 |
| 4 | | | WIRING TABLE | 2 |
| 5 | | DEVICE NUMBER | WIRING TABLE | 1 |
| 6 | | | MOUNTING DIAGRAM | 2 |
| 7 | | PANEL NUMBER | MOUNTING DIAGRAM | 1 |
| 8 | | | WIRING TABLE | 2 |
| 9 | | | TERMINAL BLOCK CONNECTION DIAGRAM | 3 |

FIG. 8B

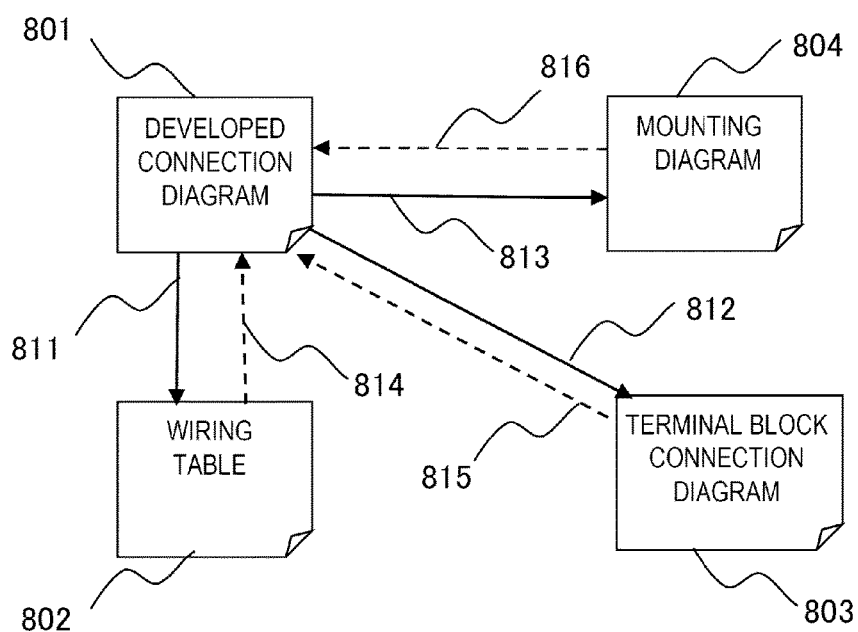

FIG. 9A

WORK SUPPORT SYSTEM
REGISTER CHARACTER TYPE DETERMINATION RULE

[REGISTER RULE]

| # | CHARACTER STRING INDICATION TARGET TYPE | CHARACTER TYPE | | | NUMBER OF CHARACTERS | | INCLUSION | | | LISTED DRAWING TYPE |
|---|---|---|---|---|---|---|---|---|---|---|
| | | ALPHABETIC CHARACTER | NUMERAL | JAPANESE | MAXIMUM | MINIMUM | # | FORWARD | REVERSE | |
| 1 | PANEL NUMBER | ☑ | ☑ | ☐ | 5 | 3 | - | - | - | MOUNTING DIAGRAM |
| 2 | DRAWING NUMBER | ☑ | ☑ | ☐ | 7 | 3 | - | - | - | DEVELOPED CONNECTION DIAGRAM |
| 3 | DEVICE NUMBER | ☑ | ☑ | ☐ | 10 | 6 | 2 | ☐ | ☑ | - |
| | | | | | | | | | | |

FIG. 9B

| # | CHARAC-TER STRING INDICATION TARGET TYPE | CHARACTER TYPE ||| NUMBER OF CHARACTERS || INCLUSION |||  LISTED DRAWING TYPE |
|---|---|---|---|---|---|---|---|---|---|---|
| | | ALPHA-BETIC CHARAC-TER | NUME-RAL | JAPA-NESE | MAXI-MUM | MINI-MUM | # | FORWARD | REVERSE | |
| 1 | PANEL NUMBER | ☑ | ☑ | ☐ | 5 | 3 | - | - | - | MOUNTING DIAGRAM |
| 2 | DRAWING NUMBER | ☑ | ☑ | ☐ | 7 | 3 | - | - | - | DEVELOPED CONNECTION DIAGRAM |
| 3 | DEVICE NUMBER | ☑ | ☑ | ☐ | 10 | 6 | 2 | ☐ | ☑ | - |
| 4 | INTERNAL WIRING NUMBER | ☑ | ☑ | ☐ | 9 | 5 | 2 | ☑ | ☑ | - |
| 5 | EXTERNAL WIRING NUMBER | ☑ | ☑ | ☐ | 13 | 8 | 1 | ☐ | ☐ | - |

| CHARACTER STRING INDICATION TARGET TYPE | KEYWORD |
|---|---|
| PANEL NUMBER | "#" |
| DRAWING NUMBER | "No." |
| DEVICE NUMBER | "SW","CPU","PIO","Δ" |
| INTERNAL WIRING NUMBER | "Δ" |
| EXTERNAL WIRING NUMBER | - |

FIG. 12A

| FILE | PAGE | DRAWING NUMBER |
|---|---|---|
| DEVELOPED CONNECTION DIAGRAM 1. pdf | 1 | PG03 |
| | 2 | PE01 |
| | 3 | PE02 |
| DEVELOPED CONNECTION DIAGRAM 2. pdf | 1 | PD02 |
| | 2 | PD03 |

FIG. 12B

| FILE | PAGE | PANEL NUMBER |
|---|---|---|
| MOUNTING DIAGRAM 1. pdf | 1 | CF01 |
| | 2 | CF02 |
| MOUNTING DIAGRAM 2. pdf | 1 | HT02 |

FIG. 15C

| # | WIRING NUMBER | FIRST END WIRING DESTINATION | | | SECOND END WIRING DESTINATION | | |
|---|---|---|---|---|---|---|---|
| | | DRAWING NUMBER | DEVICE NUMBER | TERMI-NAL | DRAWING NUMBER | DEVICE NUMBER | TERMI-NAL |
| 1 | 5APE01 | PE01 | SW01PE01 | 7 | PE01 | SW02PE01 | 2 |
| 2 | 5BPE01 | PE01 | SW01PE01 | 6 | PG03 | AD03PG03 | 4 |
| 3 | PD032A | PD03 | SW01PD03 | 7 | PE01 | SW01PE01 | 2 |
| 4 | PD032B | PD03 | SW01PD03 | 6 | PE01 | SW01PE01 | 3 |

| PANEL NUMBER | HT02 |
|---|---|
| | WIRING TABLE |
| | 2 |

WIRING TABLE

| No. | LINK SOURCE DRAWING TYPE | CHARACTER STRING INDICATION TARGET TYPE | LINK DESTINATION DRAWING TYPE | PRIORITY |
|---|---|---|---|---|
| 1 | WIRING TABLE | UNIQUE LINE NUMBER | TERMINAL BLOCK CONNECTION DIAGRAM | 1 |
| 2 | | | MOUNTING DIAGRAM | 2 |
| 3 | | EXTERNAL WIRING | TERMINAL BLOCK CONNECTION DIAGRAM | 1 |
| 4 | | INSTRUMENT NUMBER | MOUNTING DIAGRAM | 1 |
| 6 | | PANEL NUMBER | PANEL NUMBER | 1 |

FILE MANAGEMENT SYSTEM AND WORK SUPPORT SYSTEM

CROSS-REFERENCE TO RELATED APPLICATION

This application claims the priority of Japanese Patent Application No. 2023-090661 filed on Jun. 1, 2023, which is incorporated herein by reference in its entirety.

BACKGROUND OF THE INVENTION

1. Field of the Invention

The present invention relates to a file management system that manages a data file including a character string.

2. Description of Related Art

In recent years, digitization in a work site has been accelerated, and work using a portable terminal that inputs work information has been widely used. A worker works on the portable terminal with reference to drawings in the same manner as work using paper in the related art. In a case of a large-scale system, drawings to be referred to include a wide variety of drawings such as a drawing illustrating an entire electrical connection and a drawing illustrating characteristics and an outer shape of each component, and therefore, the worker needs to search for a corresponding page from a plurality of drawing files. In a case of digitalized work, by setting a link from a page of one drawing to a page of another related drawing, it is possible to omit an act of searching for a page by a worker, and it is possible to expect work efficiency.

With "browsing a necessary drawing by a small number of operations at a site" as a problem, Patent Literature 1 describes a technique of "A book browsing system including: a storage unit that stores drawing data; a list-up unit that searches for character strings common to a plurality of drawings of the drawing data; a browsing unit that displays the drawing data and in a case where a character string in a displayed drawing is selected, displays a link destination of the searched character string; and a link generation unit that generates a link as the link destination from links between the character strings common to the plurality of drawings in accordance with a rule. A book browsing method of a book browsing device including a storage unit that stores drawing data and a link generation unit that generates a link of a drawing, in which the book browsing device searches for a character string common to a plurality of drawings of the drawing data and generates a link in accordance with a rule for the character string common to the plurality of drawings." (see abstract).

CITATION LIST

Patent Literature

Patent Literature 1: JP2011-158929A

SUMMARY OF THE INVENTION

In the drawing data of a large-scale system, a capacity of a drawing file is large, and therefore, labor is required for work of individually setting links. When link setting is inappropriate for work to be actually executed, a plurality of link destinations are generated for one character string. Thus, there are problems that the worker needs to select a target drawing page from a plurality of links and the efficiency of browsing is reduced.

The present invention has been made in view of the above problems, and an object thereof is to provide a technique capable of setting an appropriate link destination when there are a plurality of link destination candidates among data files.

A file management system according to the present invention determines a type of a target indicated by a character string described in a data file to determine whether the target matches among data files and assigns a link among the data files when the target matches.

With the file management system according to the present invention, an appropriate link destination can be set when there are a plurality of link destination candidates among data files. Problems, configurations, effects, and the like other than those described above will become apparent in the following description of embodiments.

BRIEF DESCRIPTION OF THE DRAWINGS

FIG. 4B is an example of a wiring table.

FIG. 4D is an example of a terminal block connection diagram.

FIG. 6 enumerates examples of character strings described in a document file in the first embodiment.

FIG. 7 is an example of a screen used on the management terminal 20 when a user registers a link rule in S203.

FIG. 8A is an example of the link rule.

FIG. 8B illustrates a link relation among files when a link is formed in accordance with the rule in FIG. 8A.

FIG. 9A is an example of a screen used on the management terminal 20 when the user registers a character type determination rule in S203.

FIG. 9B illustrates a specific example of the character type determination rule.

FIG. 12A is an example of a drawing number list.

FIG. 12B is an example of a panel number list.

FIG. 15C is a display example on the work terminal 30 in S206.

DESCRIPTION OF EMBODIMENTS

First Embodiment: Overview

Figure 1:
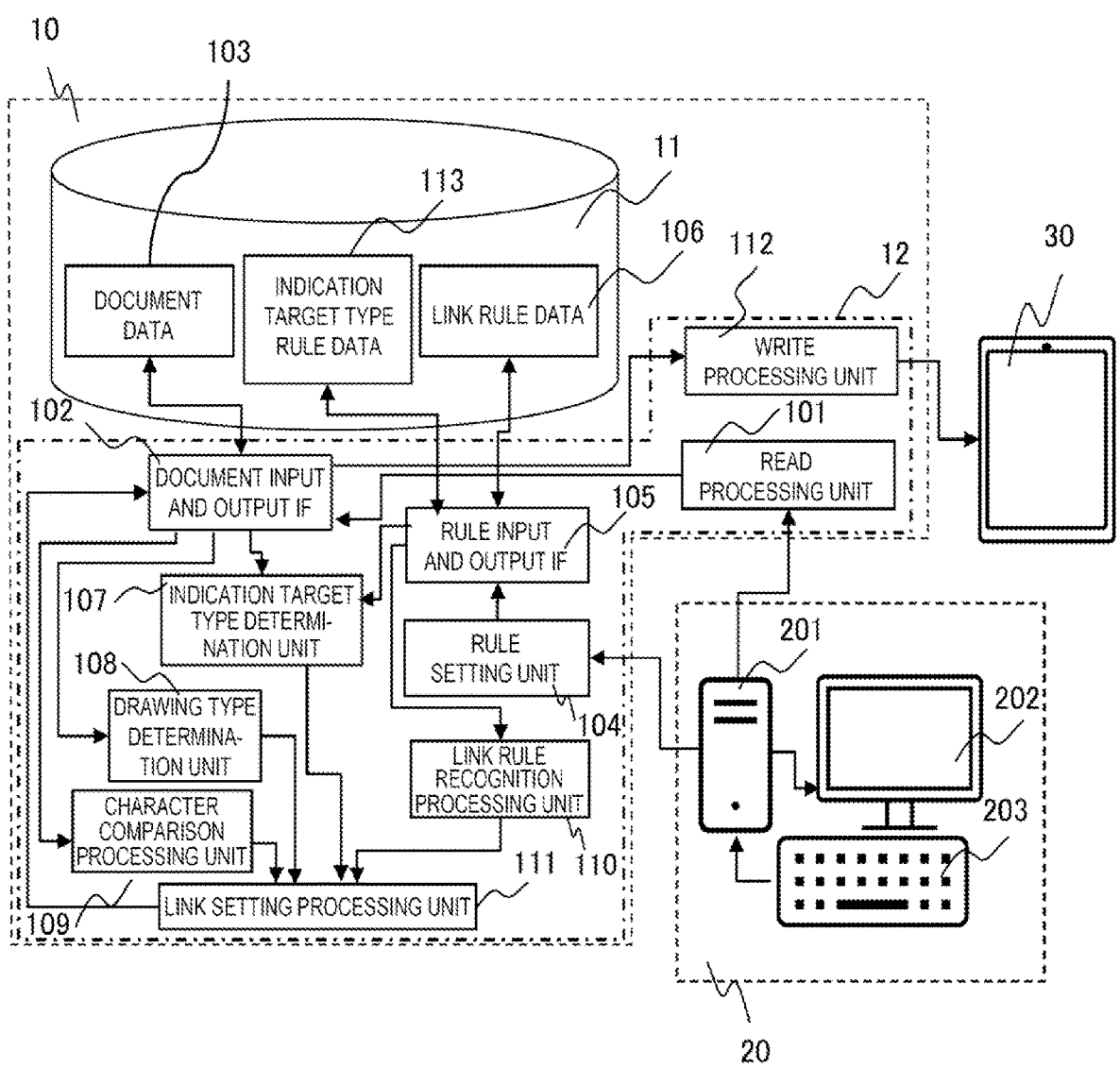
FIG. 1 is an overall configuration diagram of a work support system and a file management system 10 according to a first embodiment.

Hereinafter, a work support system according to a mode (embodiment) for carrying out the present invention will be described. A work support system includes a file management system that manages a document (drawing) file to be used by a work user for work, a management terminal for a management user to register the drawing file in the file management system and operate the drawing file, and a work terminal for the work user to display the document file.

The management user registers the document file used for predetermined work in the file management system using the management terminal. At the time of registration, the file management system is instructed to assign a link. In response to the link assignment instruction, the file management system creates data in which link information is assigned to the document file, and writes the data to the work terminal. A worker uses the work terminal to execute predetermined work while displaying the document file. At the time of the work, efficiency of an operation can be improved by using a link function suitable for a content of the work.

First Embodiment: Overall Configuration

FIG. 1 is an overall configuration diagram of a work support system and a file management system 10 according to a first embodiment of the present invention. The work support system includes the file management system 10, a management terminal 20, and a work terminal 30. The file management system 10 and the management terminal 20 are connected via a wired or wireless network, and can perform data communication with each other. The file management system 10 according to the first embodiment sets a plurality of pieces of document data and link rules input from the management terminal 20 to assign link information to the document data, and writes the document data to the work terminal 30. The file management system 10 and the work terminal 30 are connected by a wired or wireless network and can communicate with each other.

In the present first embodiment, the following description will be made assuming that the work support system supports work such as manufacturing, maintenance, inspection, and modification of a system including a plurality of control panels that electrically control a plant and infrastructure facilities. The document data is data such as a drawing or description relating to an electrical device such as a control panel. However, the present embodiment can also be applied to a file management system that manages other document data or a work support system.

First Embodiment: Configuration of Server

The file management system 10 is configured with, for example, a computer, and includes a storage unit 11, an arithmetic processing unit 12, a read processing unit 101, a document input IF 102, a rule setting unit 104, a rule input and output IF 105, an indication target type determination unit 107, a drawing type determination unit 108 (file type determination unit), a character comparison processing unit 109, a link rule recognition processing unit 110, a link setting processing unit 111, and a write processing unit 112.

The read processing unit 101, the document input IF 102, the rule setting unit 104, the rule input and output IF 105, the indication target type determination unit 107, the drawing type determination unit 108, the character comparison processing unit 109, the link rule recognition processing unit 110, the link setting processing unit 111, and the write processing unit 112 are configured as processing by software, and are implemented by the arithmetic processing unit 12. The software is recorded in the storage unit 11, loaded into a memory (not illustrated) at the time of operating, and executed by the arithmetic processing unit 12. The arithmetic processing unit 12 is, for example, a processor such as a central processing unit (CPU).

First Embodiment: Configuration of Storage Unit

The storage unit 11 includes a storage device such as a read only memory (ROM), a random access memory (RAM), and a solid state drive (SSD). The storage unit 11 stores document data 103, link rule data 106, and indication target type rule data 113.

First Embodiment: Configuration of Management Terminal

The management terminal 20 includes a processing unit 201, a display unit 202, and an operation unit 203. The processing unit 201 is a computer. The display unit 202 is a display. The operation unit 203 is an operation device such as a keyboard or a mouse. The processing unit 201 and the file management system 10 are connected by a wired or wireless network such as Ethernet or Wi-Fi. The display unit 202 and the processing unit 201 are connected in a wired manner such as HDMI or DisplayPort or in a wireless manner such as Wi-Fi, and display a screen for notifying the user of a processing procedure situation or the like. The operation unit 203 is connected to the processing unit 201 in a wired manner such as USB or in a wireless manner such as Bluetooth, and inputs an operation of the user to the processing unit 201.

The management terminal 20 may have a configuration in which the processing unit 201 is omitted. In this case, the display unit 202 and the operation unit 203 are connected to the file management system 10 in a wired or wireless manner.

The management terminal 20 is connected to the read processing unit 101 and the link setting processing unit 111 via the processing unit 201. The processing unit 201 internally includes software for connecting to the read processing unit 101 and the link setting processing unit 111, a general Internet browser, or the like, and performs connection processing by the software or the Internet browser.

Alternatively, the management terminal 20 may be a device such as a tablet or a smartphone, and in a case of this configuration, the processing unit 201, the display unit 202, and the operation unit 203 are configured as one hardware.

First Embodiment: Configuration of Work Terminal

The work terminal 30 is a terminal that can be carried by a worker and has a function of displaying the document data stored therein, and is an electronic paper terminal, a tablet, or a smartphone. The work terminal 30 includes a touch sensor on the same surface as the screen, and can perform an input operation by touching with a pen, a finger, or the like.

First Embodiment: Overall Operation

Figures 2, 3:
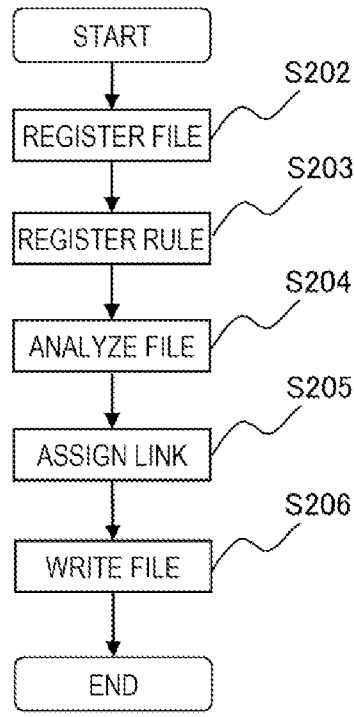
FIG. 2 is a flowchart illustrating an operation of the work support system.
FIG. 3 is an example of a screen used by a user on a management terminal 20 in S202.

FIG. 2 is a flowchart illustrating the operation of the work support system. Processing of assigning a link to the document data and writing the document data to the work terminal 30 will be described with reference to FIG. 2.

Step S202 is a file registration step. The user registers a document file to be used as a work file in the file management system 10 using the management terminal 20.

Step S203 is a rule registration step, and a rule is registered from the management terminal 20 as in step S202. There are two types of rules to be registered: a link setting rule and a rule of determining a type of a character string included in a file. Details will be described later.

Step S204 is a file analysis step, and a type of a target indicated by a character string included in the document file registered in step S202 is analyzed.

Step S205 is a link assigning step, and a link is assigned to the document data according to the type of the indication target of the character string analyzed in step S204 in accordance with the rule registered in step S203.

Step S206 is a file writing step, and the document file registered in step S202 and the document file to which a link is assigned in step S205 are written to the work terminal 30.

First Embodiment: File Registration Step

FIG. 3 is an example of a screen to be used by the user on the management terminal 20 in S202. In S202, the user registers a document file from the management terminal 20. The management terminal 20 transfers document data to the read processing unit 101. The read processing unit 101 provides the screen as illustrated in FIG. 3 to the display unit 202, and the user registers a document file using the screen. After pressing a file selection button, the user selects a document file to be transferred to the file management system 10, and presses an upload button. By the above operation, the selected document file is transferred to the file management system 10. The read processing unit 101 receives document file data from the management terminal 20, and stores the document file data as the document data 103 in the storage unit 11 via the document input IF 102. The document file data may be selected from those stored in advance as the document data 103 of the file management system 10.

FIGS. 4A to 4D illustrate four types of drawings to be handled in the present embodiment.

Figure 4A:
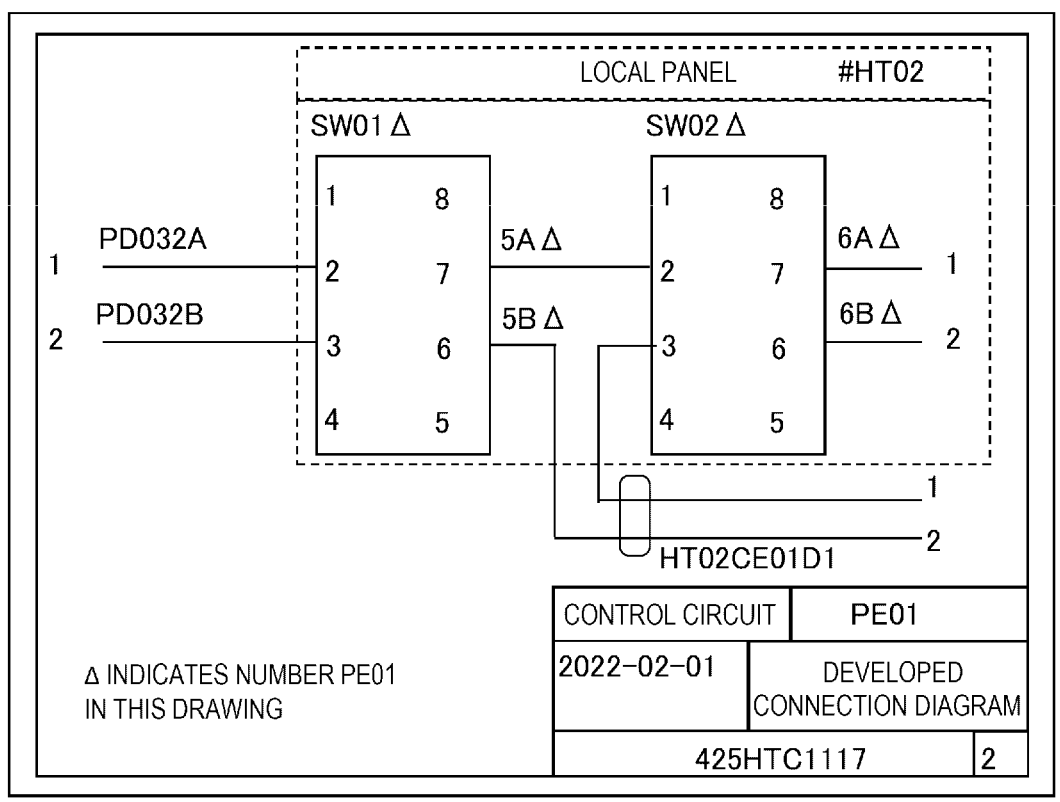
FIG. 4A is an example of a developed connection diagram.

FIG. 4A is a developed connection diagram. The developed connection diagram is a diagram illustrating an electrical connection between wiring and a component included in an electrical device as a work target. "SW01Δ" and "SW02Δ" in the drawing are device numbers indicating devices, respectively, and indicate that the devices are attached to a control panel named "local panel" surrounded by a broken line. "#HT02" is a unique panel number assigned to the control panel. "PD032A", "PD032B", "5AΔ", "5BΔ", "6AΔ", and "6BΔ" described in the vicinity of the wiring are wiring numbers, and are unique numbers assigned to internal wiring connecting the devices in the control panel. "HT02CE01D1" is an external wiring number and is a unique number assigned to external wiring used for connection between the control panel and another control panel. In the developed connection diagram, a drawing number unique to each page is assigned, for example, "PE01". "Δ" in the drawing is a symbol in which a drawing number of the page is omitted, and for example, "SW01Δ" is "SW01PE01" when being described without omission.

FIG. 4B is a wiring table, and is a table in which wiring numbers are summarized. As illustrated in FIG. 4B, a drawing number and a device number of a device to which both ends of wiring indicated by each wiring number are connected are summarized.

Figure 4C:
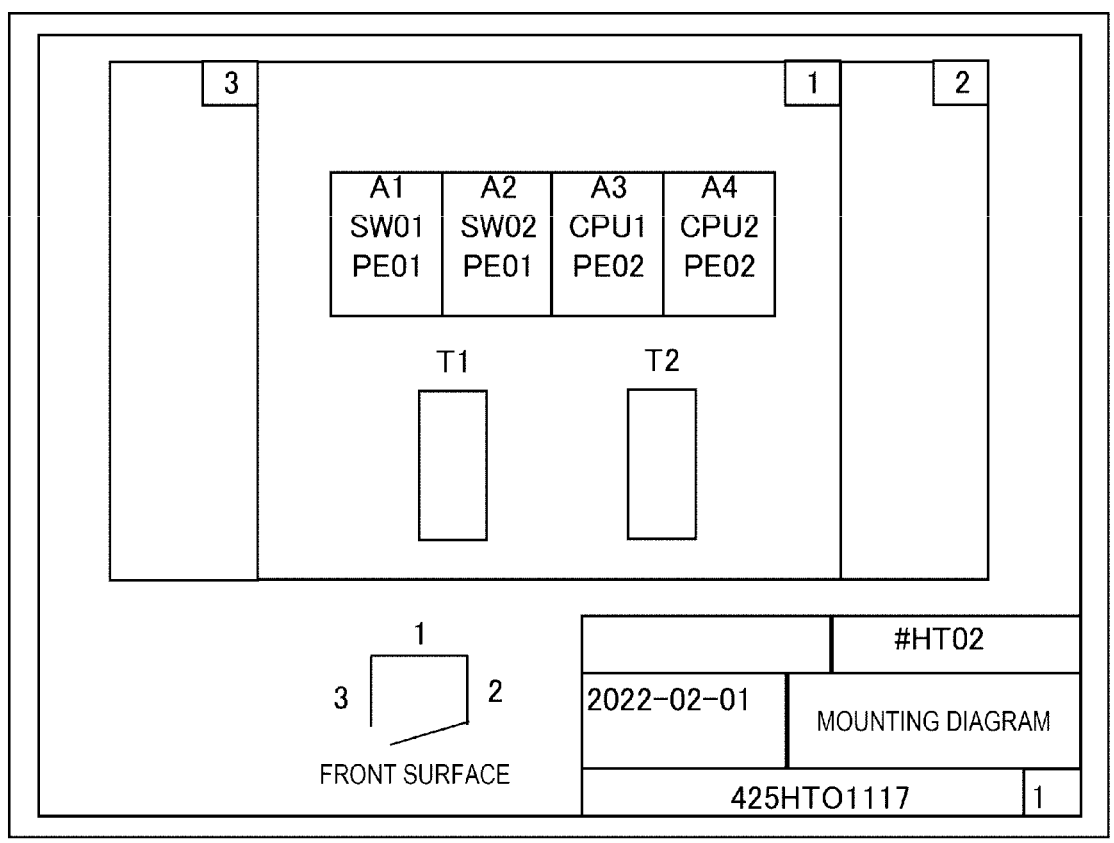
FIG. 4C is an example of a mounting diagram.

FIG. 4C is a mounting diagram, and is a diagram illustrating an arrangement of the devices attached to the control panel. The example of FIG. 4C indicates that devices "SW01PE01", "SW02PE01", "CPU1PE02", and "CPU2PE02" and terminal blocks "T1" and "T2" are attached to a panel number "#HT02".

FIG. 4D is a terminal block connection diagram and illustrates internal wiring and external wiring connected to the terminal blocks "T1" and "T2" attached to the control panel of panel number "#HT02".

In the present embodiment, the drawings are stored as different PDF files for each type. One PDF file may include a plurality of pages of the same type of drawing. A plurality of PDF files of the same drawing type may be registered. A format of the document file is not limited to PDF.

Figure 5:
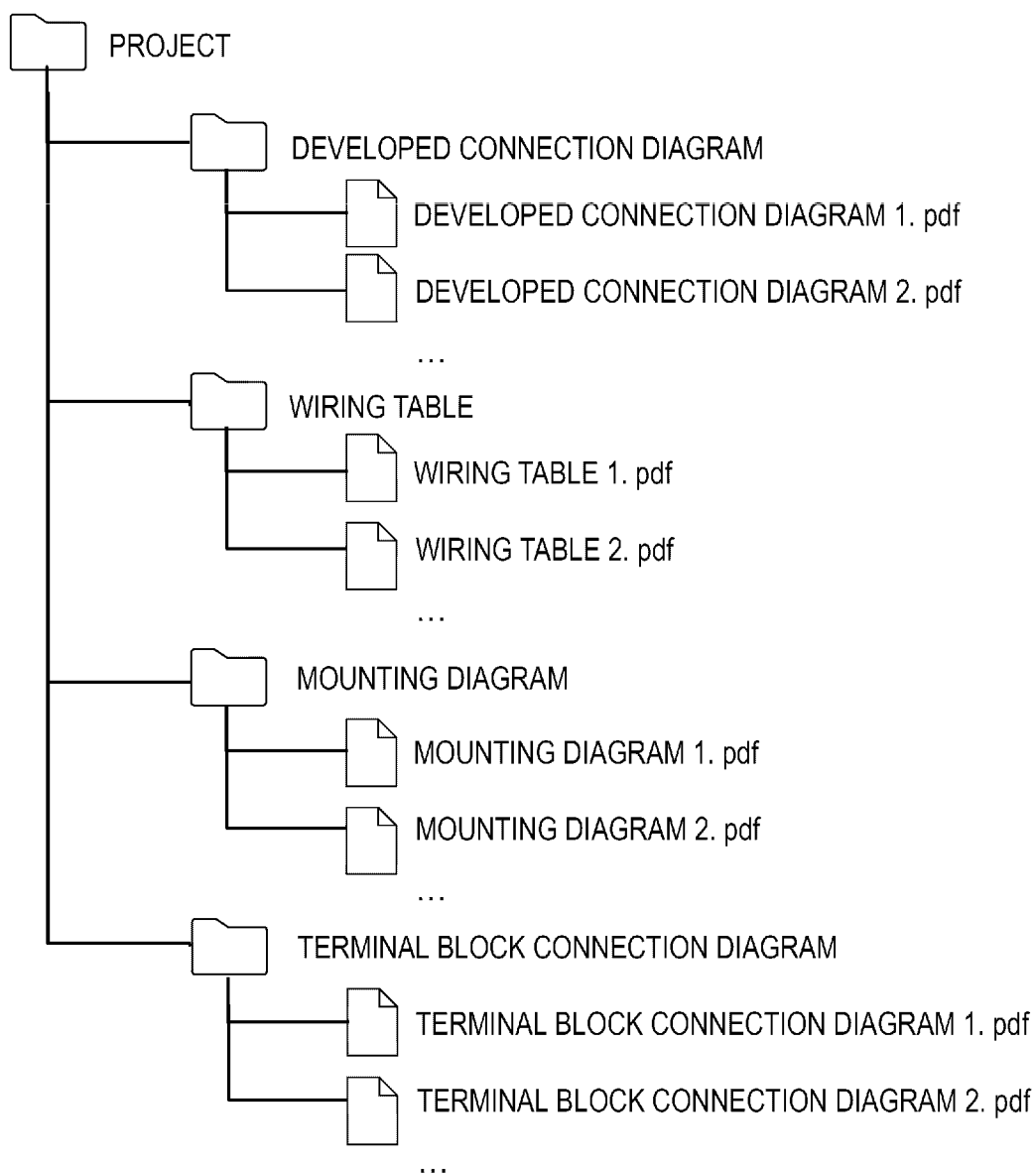
FIG. 5 illustrates an example of a folder structure in a storage unit 11.

FIG. 5 illustrates an example of a folder structure in the storage unit 11. In a case where a document file is registered, a folder structure in which a file of each drawing is stored is formed in a folder for each drawing type under a project folder, and is stored as the document data 103 in the storage unit 11, as illustrated in FIG. 5.

FIG. 6 enumerates examples of character strings described in a document file according to the present embodiment.

First Embodiment: Rule Registration Step

FIG. 7 is an example of a screen used on the management terminal 20 when a user registers a link rule in S203. The user uses the operation unit 203 of the management terminal 20 to register a link rule corresponding to work scheduled to be executed and a character string type determination rule. First, registration of a link rule will be described.

The user connects to the rule setting unit 104 using the management terminal 20. The rule setting unit 104 provides a screen as illustrated in FIG. 7 to the display unit 202 of the management terminal 20. In the screen of FIG. 7, the user selects and registers a work content scheduled to be executed. The rule setting unit 104 selects and sets, from the link rule data 106 via the rule input and output IF 105, a link rule corresponding to the work content selected by the user.

FIG. 8A is an example of the link rule. As illustrated in FIG. 8A, the link rule describes a drawing type of a link destination for a drawing type of a link source and a type of a character string indication target. When there are a plurality of drawing types of different link destinations for the same link source drawing and character string indication target type, a priority is also described. It is assumed that the lower the numeral, the higher the priority.

FIG. 8B illustrates a link relation among files at the time of forming a link in accordance with the rule in FIG. 8A. An arrow 811 directed from a developed connection diagram 801 serving as a link source to a wiring table 802 serving as a link destination indicates Nos. 1, 4, 5, and 8 in FIG. 8A, and indicates that a link is assigned to character strings of unique line number, external wiring, instrument number, and panel number, respectively. Similarly, an arrow 812 directed from the developed connection diagram 801 to a terminal block connection diagram 803 indicates Nos. 2, 3, and 9 in FIG. 8A, and an arrow 813 directed from the developed connection diagram 801 to a mounting diagram 804 indicates Nos. 6 and 7.

Arrows 814, 815, and 816 indicated by broken lines are links in opposite directions to the arrows 811, 812, and 813, respectively. As indicated by these arrows, a link in the opposite direction may be provided. In addition, at the time of registering the link rule, selection of work type is exemplified as illustrated in FIG. 7, but alternatively, information as illustrated in the table of FIG. 8A may be input.

FIG. 9A is an example of a screen used on the management terminal 20 when the user registers the character type determination rule in S203. Similarly to the registration of the link rule, the user connects to the rule setting unit 104 using the management terminal 20. The rule setting unit 104 provides the screen as illustrated in FIG. 9A to the display unit 202 of the management terminal 20. On the screen in FIG. 9A, the user registers a rule described in the drawing for each type of target indicated by each character string illustrated in FIG. 6 as the character string type determination rule.

FIG. 9B illustrates a specific example of the character type determination rule. As illustrated in FIG. 9B, the character string type determination rule describes, for each character string indication target type, conditions such as (a) which character type is included, such as alphabetic characters, numerals, Japanese, and the like, (b) minimum and maximum values of the number of characters, and (c) when another character string type is included, forward coincidence or reverse coincidence with a number thereof (whether another character string type is included in a foremost part or a last part of a character string). "#" in FIG. 9B indicates, when another character string type is included, a number of the character string type. Further, in a case where a list can be created in a title column or the like of a specific drawing type, conditions such as the drawing type are described.

Figures 10, 11:
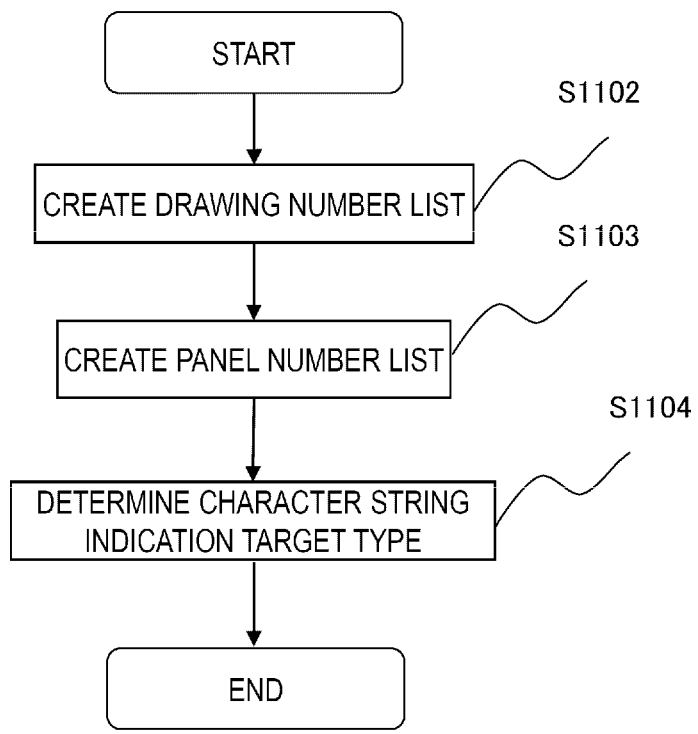
FIG. 10 illustrates another example of the character type determination rule.
FIG. 11 is a flowchart illustrating details of a file analysis step.

FIG. 10 illustrates another example of the character type determination rule. Instead of or in addition to the rule described with reference to FIG. 9B, a keyword included in each drawing type may be designated as illustrated in FIG. 10. In a case where the keyword is included in the character string, the character string is determined to be the type designated by the "character string indication target type" in FIG. 10.

First Embodiment: Overview of Character String Indication Target Determination Processing Unit S204 (file analysis step) will be described. In S204, a type of a target indicated by a character string included in each document file (indication target) is determined. The indication target type is a content of a "type of indication target" column or a corresponding "character string type" column in the example of FIG. 6. The indication target refers to a target such as a unique component or drawing indicated by the number of each character string described in an "example" column in FIG. 6.

FIG. 11 is a flowchart illustrating details of the file analysis step. The present flowchart is executed by the indication target type determination unit 107.

Step S1102 is a drawing number list creation step. In this step, a drawing number described in each page is acquired for a file whose drawing type is the developed connection diagram, and a list thereof is created.

Step S1103 is a panel number list creation step. In this step, a panel number described in each page is acquired for a file whose drawing type is the mounting diagram, and a list thereof is created.

Step S1104 is a character string indication target type determination step. In this step, a type of a target indicated by a character string described in the registered document file is determined.

First Embodiment: Drawing Number List Creation Step and Panel Number List Creation Step Steps S1102 (drawing number list creation step) and S1103 (panel number list creation step) will be described.

In step S1102, the indication target type determination unit 107 acquires a document file whose file type is the developed connection diagram among the document data 103 in the storage unit 11 using the document input IF 102.

In the developed connection diagram, the drawing number is described in a title column in the lower right of the drawing page, as illustrated in FIG. 4A. The drawing number of the drawing page can be acquired by extracting a character string configured with only alphabets and numerals and having about four characters from the character strings displayed at coordinates in the lower right of the drawing page. In addition to this method, the drawing number may be acquired by focusing on a table structure of the title column in the lower right and setting, in more detail, an area in which the drawing number is described.

FIG. 12A is an example of a drawing number list. The above processing is executed for all pages of the developed connection diagram among the registered files, and a list of drawing numbers corresponding to files and pages is created as illustrated in FIG. 12A.

FIG. 12B is an example of a panel number list. In step S1103, a panel number is extracted from a title column of the mounting diagram illustrated in FIG. 4C based on the coordinates, the character type, the number of characters, and the like in which characters are described, similarly to the drawing number list. Accordingly, a list of panel numbers corresponding to files and pages as illustrated in FIG. 12B is created.

In S1102 and S1103, a list may be created by reading a list or data in which information as illustrated in FIGS. 12A and 12B is summarized in advance, in addition to the method of extracting the number from the drawing file of the developed connection diagram or the mounting diagram.

First Embodiment: Character String Indication Target Type Determination Step

Step S1104 (character string indication target type determination step) will be described. In step S1104, the indication target type determination unit 107 acquires all document files registered in the document data 103 in the storage unit 11 one by one using the document input IF 102.

The indication target type determination unit 107 can read the indication target type rule data 113 via the rule input and output IF 105 and change the determination method in accordance with an indication target type rule. In the following description, details of S1104 will be described on the assumption that the indication target type rule in FIG. 9B is registered.

Figure 13:
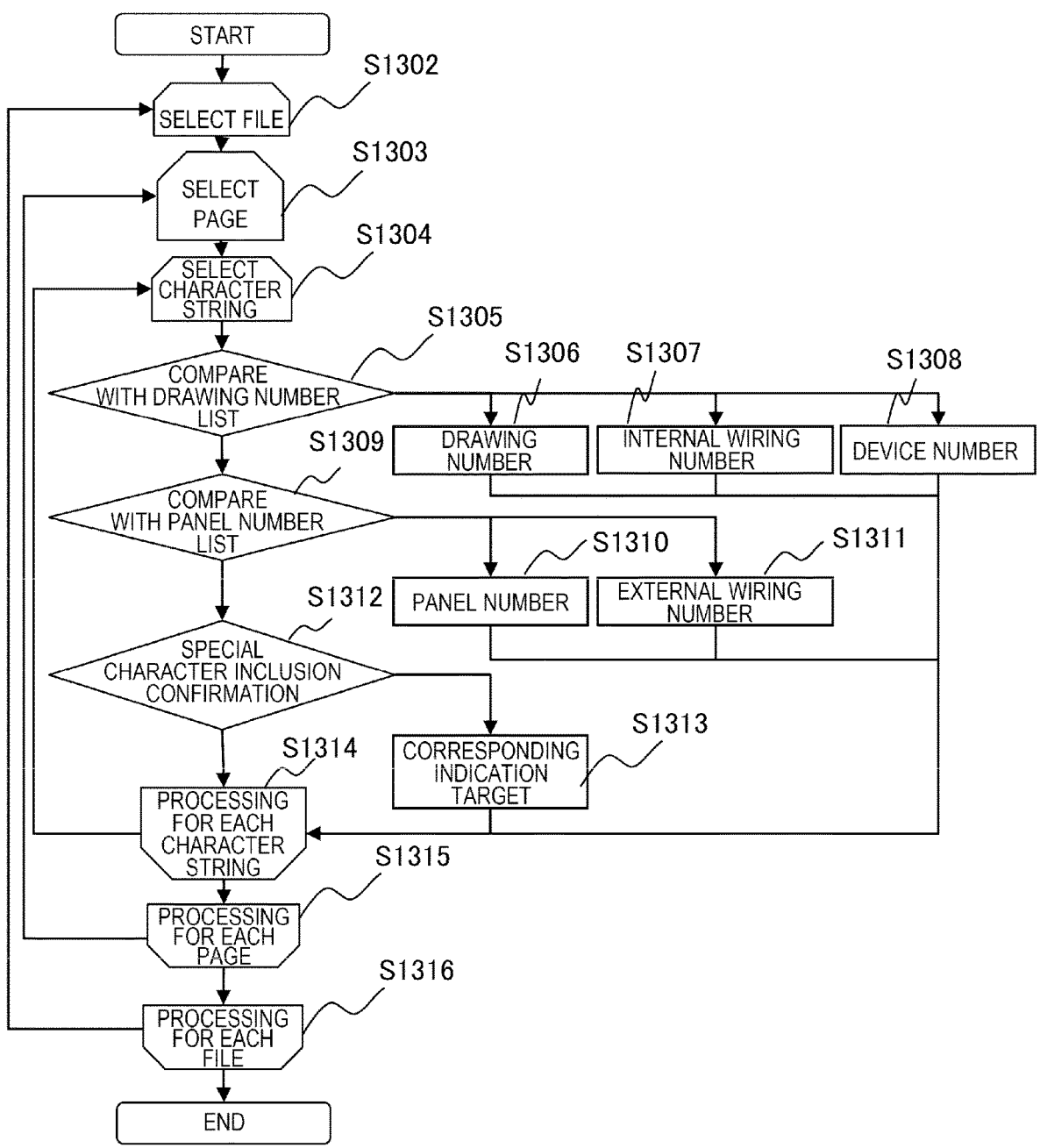
FIG. 13 is a flowchart illustrating details of S1104.

FIG. 13 is a flowchart illustrating details of S1104. This flowchart describes a procedure of determining a character string indication target type in accordance with the rule in FIG. 9B. It is therefore noted that when the rule is changed, this flowchart is also changed.

Step S1302 is a file selection step, and one file is selected from the document data.

Step S1303 is a page selection step, and one page included in the selected file is selected. For example, selection is performed from the first page of the file in number order.

Step S1304 is a character string selection step, and one of character strings included in the selected page is selected. In the present embodiment, this step includes processing of extracting only consecutive numerals and alphabets from the selected character string. In addition, when an expression in which a character string is omitted is included, this step includes processing of replacing with an expression in which a character string is not omitted.

Step S1305 is a step of comparing with the drawing number list. The character string selected in S1304 is compared with the drawing number included in the drawing number list. As a result of the comparison, when the drawing number completely matches the character string, the processing proceeds to step S1306. When the result of the comparison is partial match, determination is further performed by the number of characters of a difference obtained by subtracting the number of characters of the matched drawing number from the number of characters of the target character string. When the number of characters of the difference is two, the processing proceeds to step S1307, and when the number of characters of the difference is three, the processing proceeds to step S1308. As a result of the comparison, when none of the drawing numbers is included in the selected character string, the processing proceeds to step S1309. A branch destination step, the number of characters of a determination threshold, and a determination result based thereon in this step depend on the indication target type determination rule.

Step S1306 is a step of determining the selected character string as a drawing number. Data indicating that the type of the indication target of the character string is a drawing number is recorded in the storage unit 11 in FIG. 1 as data that may correspond to the selected character string. The data may be in a form of being added to the document data 103 or may be stored as separate data in a format associated with the document data 103. Next, the processing proceeds to step S1314.

Step S1307 is a step of determining the selected character string as an internal wiring number. Data indicating that the type of the indication target of the character string is the internal wiring number is stored as in step S1306, and the processing proceeds to step S1314.

Step S1308 is a step of determining the selected character string as a device number. Data indicating that the type of the indication target of the character string is a device number is stored as in step S1306, and the processing proceeds to step S1314.

Step S1309 is a step of comparing with the panel number list. The character string selected in S1304 is compared with the panel number included in the panel number list. As a result of the comparison, the processing proceeds to step S1310 when the panel number and the character string completely match. When the result of comparison is partial match, the processing proceeds to step S1311. As a result of the comparison, the processing proceeds to step S1312 when none of the panel numbers is included in the selected character string. The determination result depends on the indication target type determination rule.

Step S1310 is a step of determining the selected character string as a panel number. Data indicating that the type of the indication target of the character string is the panel number is stored as in step S1306, and the processing proceeds to step S1314.

Step S1311 is a step of determining the selected character string as an external wiring number. Data indicating that the type of the indication target of the character string is the external wiring number is stored as in step S1306, and the processing proceeds to step S1314.

Step S1312 is a special character inclusion confirmation step. The indication target type of the selected character string is determined based on a keyword (exemplified in FIG. 10) included in the character string. As the keyword, a specific word is registered for each indication target type of the character string. When the registered keyword is included in the selected character string, the processing proceeds to step S1313. When none of the keywords is included, the processing proceeds to step S1314.

In step S1313, the indication target type corresponding to the keyword included in the character string is acquired, and regarding the indication target type, data indicating the indication target type of the character string is stored in the same procedure as steps S1306 to S1311. Next, the processing proceeds to step S1314.

In step S1314, it is determined whether there is a remaining character string that is not selected in the currently selected page, and when there is a remaining character string, the processing returns to step S1304, one of the remaining character strings is selected, and the processing is continued. When there is no remaining character string, the processing proceeds to step S1315.

In step S1315, it is determined whether there is a remaining page that is not selected in the currently selected file. When there is a remaining page, the processing returns to step S1303, one of the remaining pages is selected, and the processing is continued. When there is no remaining page, the processing proceeds to step S1316.

In step S1316, it is determined whether there is a remaining file that is not selected among the registered files. When there is a remaining file, the processing returns to step S1302, one of the remaining files is selected, and the processing is continued. When there is no remaining file, the flowchart ends.

In step S1306, step S1307, step S1308, step S1310, step S1311, and step S1313, a character string reflecting a change added to the character string in step S1304 may be stored in addition to the storage of the indication target type of the character string. Examples of the change added to the character string in S1304 include extraction of consecutive numerals and alphabets and replacement of omitted expressions. The order of step S1305, step S1309, and step S1312 may be changed by the indication target type rule.

As described above, in S1104, regarding the character strings included in all the registered files, a character string satisfying a condition is selected (character string indication target type determination step), and information of a type of a target indicated by the character string is stored as data corresponding to the character string.

First Embodiment: Overview of Drawing Type Determination Processing Unit

The drawing type determination unit 108 determines a type of a drawing of the document file in the document data 103. In the present embodiment, a determination result is the developed connection diagram, the wiring table, the mounting diagram, or the terminal block connection diagram illustrated in FIGS. 4A to 4D. As a determination method, for example, the determination is performed by detecting a character string indicating each drawing type included in the title column in the lower right of each drawing as illustrated in FIGS. 4A to 4D, or the determination is performed from the folder structure in which each file is stored or a name of the PDF file as illustrated in FIG. 5.

First Embodiment: Overview of Link Setting Processing Unit

Step S205 (link assigning step) will be described. In S205, the link setting processing unit 111 assigns link information to another file to the document data 103. The link rule recognition processing unit 110 reads the link rule data 106 via the rule input and output IF 105 and transmits the link rule data 106 to the link setting processing unit 111. The link setting processing unit 111 assigns link information to the document data 103 based on the received link rule data, the character string indication target type information determined by the indication target type determination unit 107, the drawing type information determined by the drawing type determination unit 108, and a result of comparison of the character string by the character comparison processing unit 109 to be described later.

Figure 14:
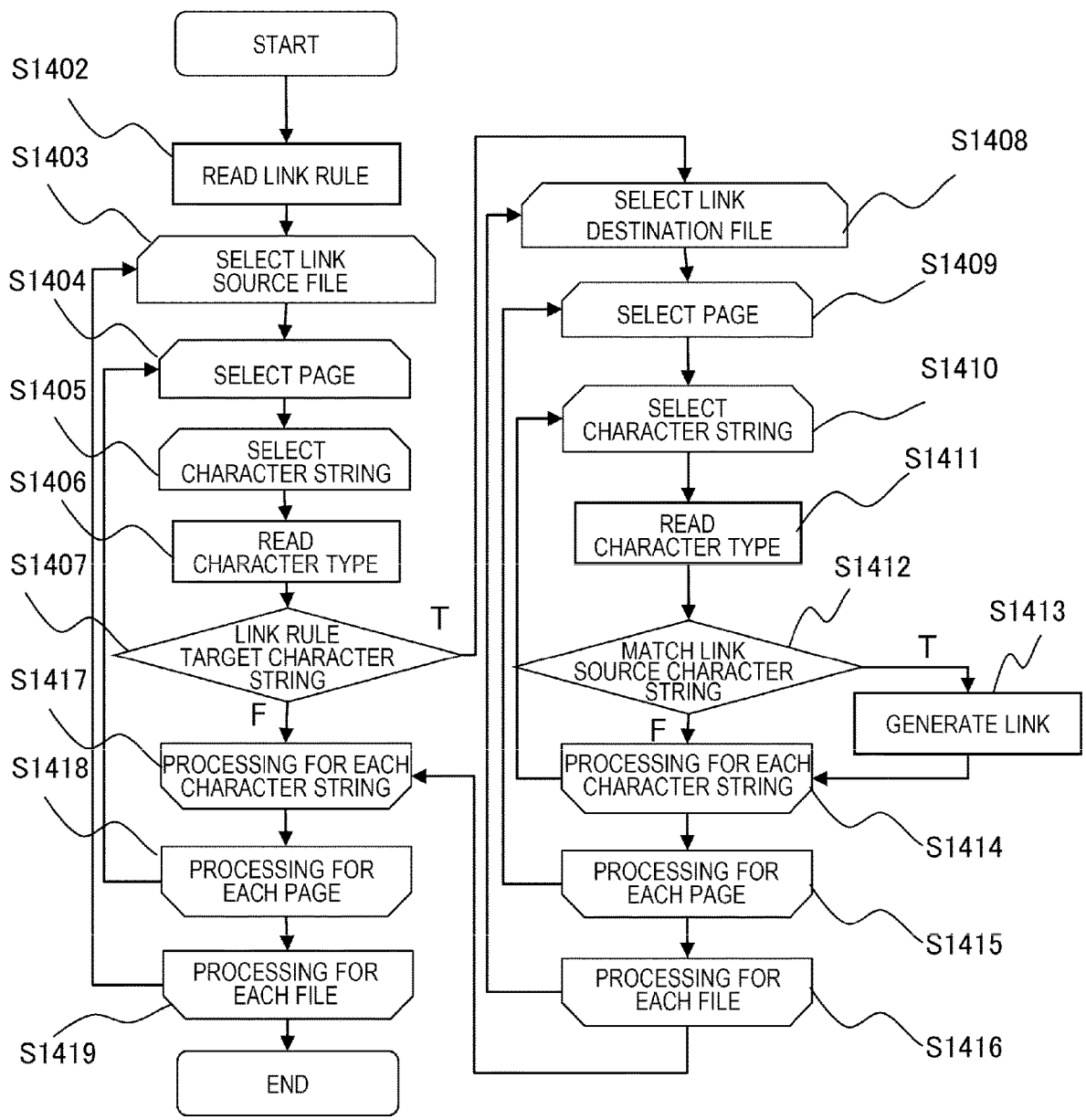
FIG. 14 is a flowchart illustrating details of S205.

FIG. 14 is a flowchart illustrating details of S205. The processing of S205 will be described using FIG. 14.

Step S1402 is a link rule reading step. In this step, the link rule recognition processing unit 110 reads the link rule data 106. The link setting processing unit 111 acquires the link rule data 106.

Step S1403 is a link source file selection step. The link setting processing unit 111 selects a file serving as a link source in accordance with the link rule read in step S1402. When the link rule is the contents illustrated in FIG. 8A, a link source drawing type is the developed connection diagram. Therefore, in step S1403, the drawing type determination unit 108 selects one file from the developed connection diagram based on a determination result of the type of the document data.

Step S1404 is a page selection step. The link setting processing unit 111 selects one page included in the file selected in S1403. For example, selection is performed from the first page of the file in number order.

Step S1405 is a character string selection step. The link setting processing unit 111 selects one of character strings included in the page selected in S1404. In the present embodiment, this step includes processing of extracting only consecutive numerals and alphabets from the selected character string. In addition, when an omitted expression is included in the character string, this step includes processing of replacing with an expression that is not omitted.

Step S1406 is a character string indication target type reading step. In this step, the indication target type determination unit 107 reads the character string indication target type corresponding to the character string selected in step S1405 from the document data 103. The read character string indication target type is the information generated in S204.

Step S1407 is a link rule target character string determination step. The link setting processing unit 111 compares the character string indication target type read in S1406 with the link rule to determine whether the character string indication target type is a character string indication target type as a target. In accordance with the link rule in FIG. 8A, when the type of the target indicated by the character string is the internal wiring number, the external wiring number, the device number, or the panel number, it is determined that the character string is a character string as a target to be assigned with the link rule. In this case, the processing proceeds to step S1408. When the character string is not a character string as a target to be assigned with the link rule, the processing proceeds to step S1417.

Step S1408 is a link destination file selection step. The link setting processing unit 111 selects a file serving as a link destination in accordance with the link rule read in step S1402. For example, when the link rule is the contents illustrated in FIG. 8A, the link source drawing type is the developed connection diagram, and when the character string indication target type is the internal wiring number, the link destination drawing type is the wiring table or the terminal block connection diagram. In step S1408, one file of the wiring table and the terminal block connection diagram is selected in accordance with the result of the determination of the type of the document data by the drawing type determination unit 108.

Step S1409 is a page selection step. The link setting processing unit 111 selects one page included in the link destination file selected in S1408. For example, selection is performed from the first page of the file in number order.

Step S1410 is a character string selection step. The link setting processing unit 111 selects one of character strings included in the page selected in S1409. In the present embodiment, this step includes processing of extracting only consecutive numerals and alphabets from the selected character string. In addition, when an omitted expression is included in the character string, this step includes processing of replacing with an expression that is not omitted.

Step S1411 is a character string indication target type reading step. In this step, the link setting processing unit 111 reads, regarding the selected character string in the link destination file, the character string indication target type as in step S1406.

Step S1412 is a character string comparison step. In this step, the character comparison processing unit 109 compares the character string of the link source file selected in step S1405 and the indication target type of the character string acquired in step S1406 with the character string of the link destination file selected in step S1410 and the indication target type of the character string acquired in step S1411, respectively. When both comparison results match, the processing proceeds to step S1413. When neither comparison results match, the processing proceeds to step S1414.

Step S1413 is a link generation step. In this step, the link setting processing unit 111 assigns link information including information of a path of the link destination file selected in step S1408 and the page selected in step S1409 to the character string selected in step S1405. The link information is written to the document data 103.

In step S1414, the link setting processing unit 111 determines whether there is a remaining character string that is not selected in the page selected in step S1409. When there is a remaining character string, the processing returns to step S1410, one of the remaining character strings is selected, and the processing is continued. When there is no remaining character string, the processing proceeds to step S1415.

In step S1415, the link setting processing unit 111 determines whether there is a remaining page that is not selected in the file selected in step S1408. When there is a remaining page, the processing returns to step S1409, one of the remaining pages is selected, and the processing is continued. When there is no remaining page, the processing proceeds to step S1416.

In step S1416, the link setting processing unit 111 determines whether there is a remaining file that is not selected among files that match a condition of the link destination. When there is a remaining file, the processing returns to step S1408, one of the remaining files is selected, and the processing is continued. When there is no remaining file, the processing proceeds to step S1417.

In step S1417, the link setting processing unit 111 determines whether there is a remaining character string that is not selected in the page selected in step S1404. When there is a remaining character string, the processing returns to step S1405, one of the remaining character strings is selected, and the processing is continued. When there is no remaining character string, the processing proceeds to step S1418.

In step S1418, the link setting processing unit 111 determines whether there is a remaining page that is not selected in the file selected in step S1403. When there is a remaining page, the processing returns to step S1404, one of the remaining pages is selected, and the processing is continued. When there is no remaining page, the processing proceeds to step S1419.

In step S1419, the link setting processing unit 111 determines whether there is a remaining file that is not selected among files that match a condition of the link source. When there is a remaining file, the processing returns to step S1404, one of the remaining files is selected, and the processing is continued. When there is no remaining file, this flowchart ends.

By the above-described processing, link information in accordance with the link rule is assigned to the document data 103 in FIG. 1.

First Embodiment: Configuration of Work Terminal

Step S206 will be described. In step S206, the document data 103 to which the link information is assigned is written to the work terminal 30. At the time of writing, the file management system 10 and the work terminal 30 are connected in a wired manner such as USB or Ethernet or in a wireless manner such as Bluetooth or Wi-Fi to be in a communicable state.

In step S206, the write processing unit 112 reads the document data 103 via the document input and output IF, converts the document data 103 into a PDF data format that can be handled by the work terminal 30, and transmits the document data 103 to the work terminal 30.

Figure 15A:
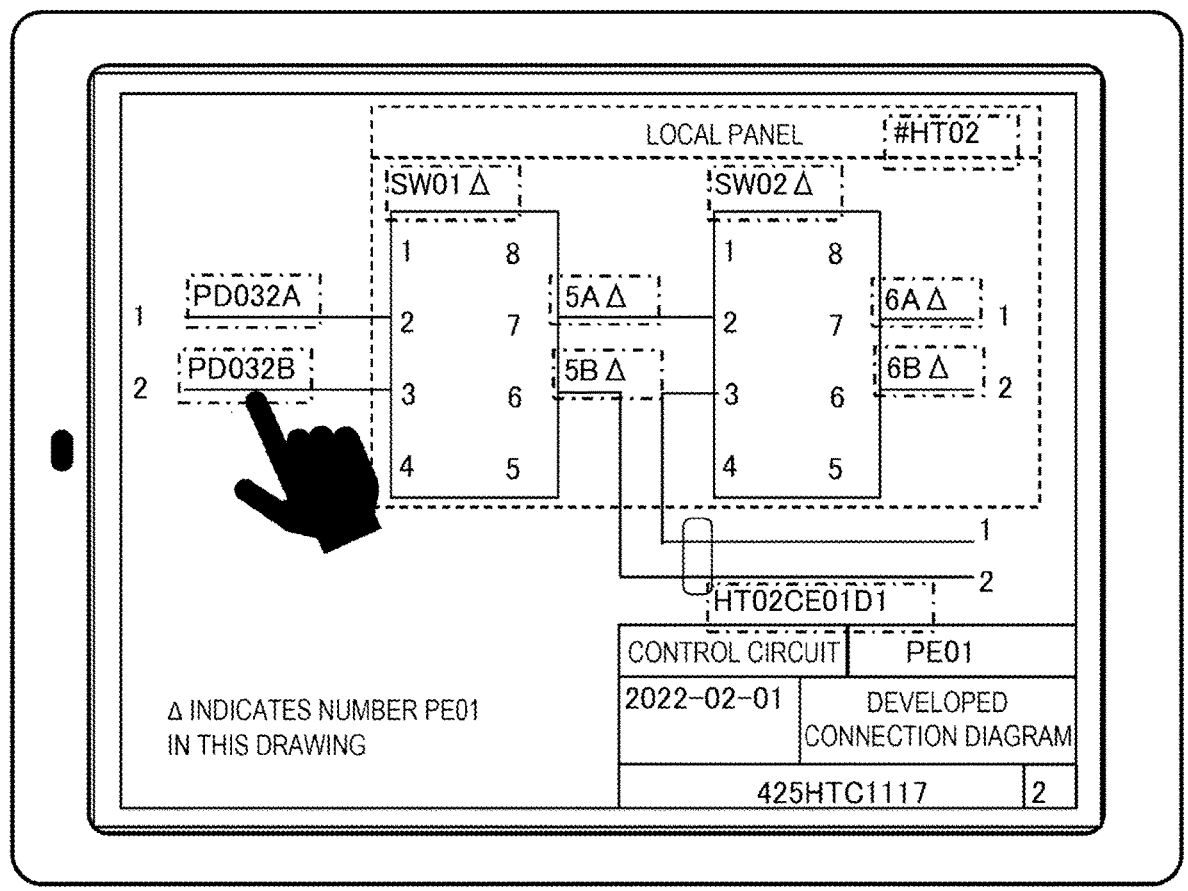
FIG. 15A is a display example on a work terminal 30 in S206.
Figure 15B:
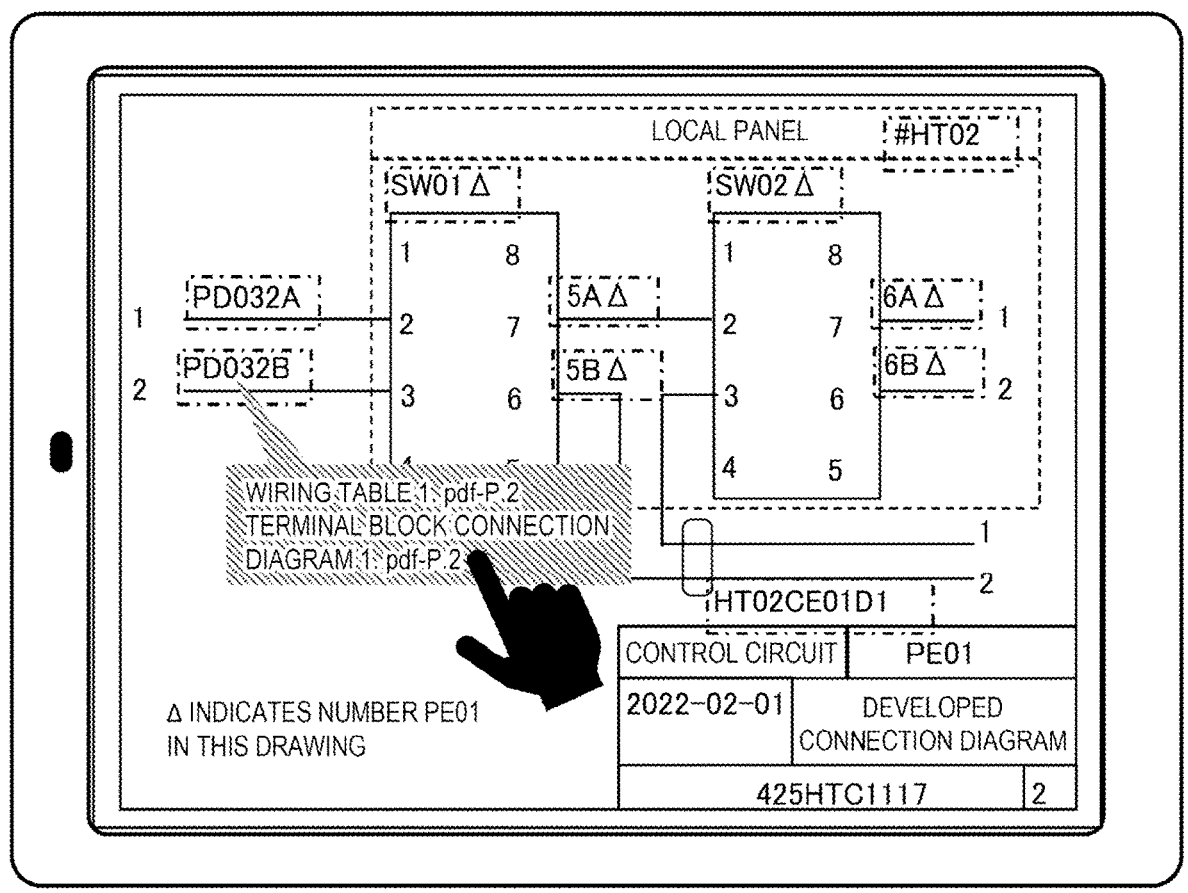
FIG. 15B is a display example on the work terminal 30 in S206.

FIGS. 15A to 15C are display examples on the work terminal 30 in S206. FIG. 15A is an example in which a file of a developed connection diagram serving as a link source is displayed on the work terminal 30. A character string to which link information is assigned is highlighted and displayed by a marker indicated by a dot-dash line. A link operation is executed by a worker touching, with a finger or an electronic pen, the character string to which a link is assigned. In a case where the character string "PD032B" in FIG. 15A is touched, the display transitions to the display in FIG. 15B. FIG. 15B displays a list of information of a link destination assigned to the character string "PD032B". Links are set for the wiring table and the terminal block connection diagram in accordance with the link rule illustrated in FIG. 8A, and are displayed in the order of priority. In a case where the displayed link destination is further touched, a file of a link destination is displayed. In a case where the link destination display "wiring table 1.pdf" in FIG. 15B is touched, the display transitions to the display in FIG. 15C. In FIG. 15C, two pages of the wiring table 1.pdf are displayed, and the keyword "PD032B" as a link source is highlighted and displayed.

A display method of the document data to which a link is assigned may be configured to be operable with omission of the screen in FIG. 15B. That is, in FIG. 15A, among link information that is valid at the time of touching the character string "PD032B", link information of the highest priority among the priorities of the link destinations specified by the link rule illustrated in FIG. 8A is automatically selected. In this case, the number of screen transitions can be reduced.

First Embodiment: Summary

The work support system according to the first embodiment sets a link to a character string of interest described in certain drawing data when a worker performs work using the work terminal 30 while laterally referring to a plurality of pieces of drawing data. Accordingly, it is possible to omit the labor of searching from another drawing data. In addition, it is possible to perform more efficient display depending on the work by specifying drawing files of a link source and a link destination or providing the priority in accordance with by the link rule corresponding to the content of the work.

Second Embodiment: Configuration in which Plurality of Link Rules are Switched

Figure 16:
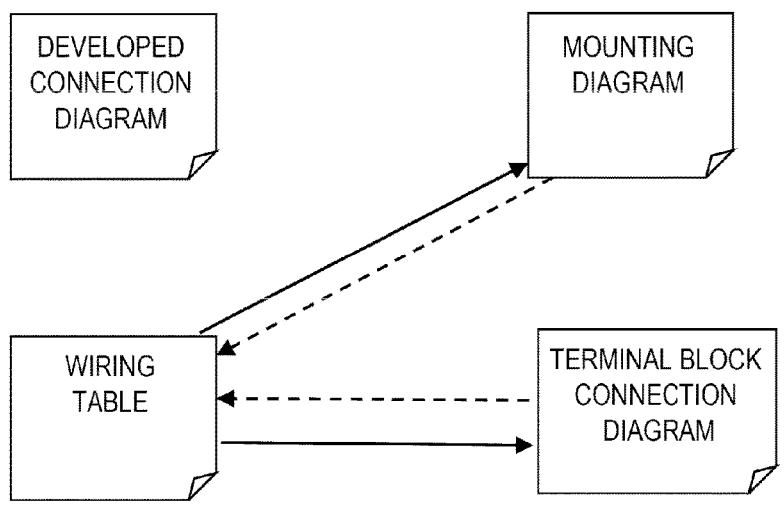
FIG. 16 is an example of a link rule according to a second embodiment.

FIG. 16 is an example of a link rule according to a second embodiment of the present invention. In the present second embodiment, a link rule different from that in FIG. 8 as illustrated in FIG. 16 can be registered in the link rule data 106 in FIG. 1 simultaneously with the link rule in FIG. 8.

In the present embodiment, the link setting processing unit 111 assigns link information to a plurality of link rules and records the link information in the document data 103. Therefore, different link information exists based on different link rules. In the present second embodiment, it is possible to select which link information to use after link assignment.

When the write processing unit 112 writes a file to the work terminal 30, a user selects any one of the link rules from the management terminal 20 or the work terminal 30, and file data to which link information corresponding to the selected content is added is written from the document data 103 to the work terminal 30. Accordingly, the work terminal 30 receives the document data in which only one of the plurality of link rules is reflected.

Alternatively, the document file may be written to the work terminal 30 in a state of having a plurality of pieces of link information at the time of writing the file. When the worker carries the work terminal 30 and performs work, one of the plurality of pieces of link information is selected by an operation on the work terminal 30. A form of the document file stored in the work terminal 30 may be stored as a plurality of files having different link information, or may be stored as data in which a plurality of pieces of link information are associated with the same document file. When the document file is stored as a plurality of files having different link information, a file displayed on the work terminal 30 is selected by selecting link information on the work terminal 30. When a plurality of pieces of link information are stored in the same file, a script for switching between valid and invalid of the link information is added to the document file, and in a case where the worker selects any one of the link rules, the script invalidates the other link information.

The link rule may be automatically switched by a worker or a work item. For example, at the time starting work, a worker inputs a worker ID or a work item to the work terminal 30 or the management terminal 20. The management terminal 20 instructs the file management system 10 to transmit only a link rule used for the worker ID or the work item to the document data. The file management system 10 writes, to the work terminal 30 in accordance with the instruction, the document data in which a link is set. Alternatively, only the link rule used for the worker ID or the work item is left on the work terminal 30, and the other link rules are invalidated.

With the configuration described above, it is possible to assign an appropriate link in accordance with a worker and a work item even when there are a plurality of link rules. Other configurations are the same as those of the first embodiment.

Third Embodiment: Cooperation Operation by Plurality of Work Terminals

Figure 17:
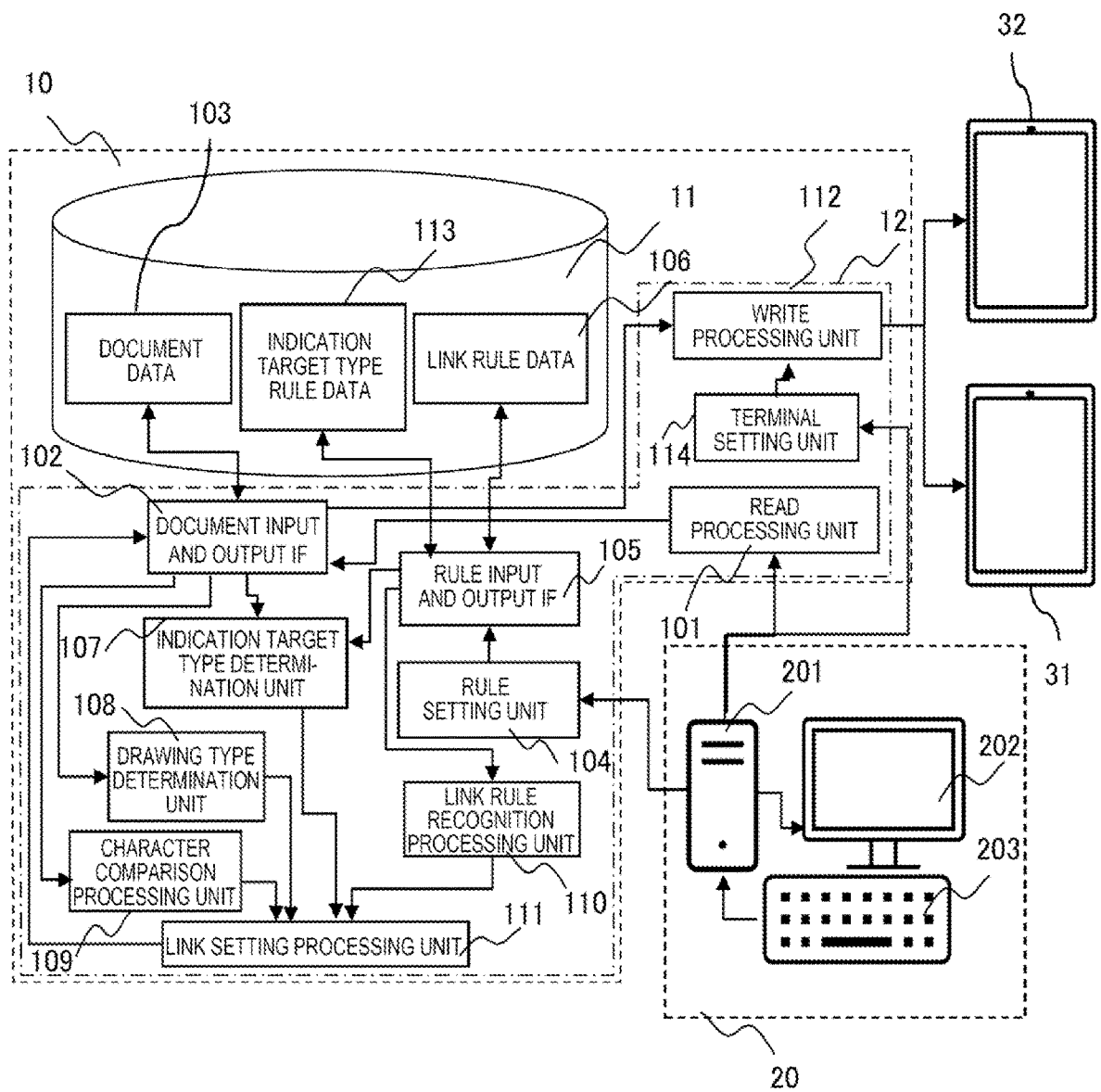
FIG. 17 is a configuration diagram of a work support system according to a third embodiment.

FIG. 17 is a configuration diagram of a work support system according to a third embodiment of the present invention. The work support system according to the present embodiment includes a file management system 10, a management terminal 20, a work terminal 31, and a work terminal 32. The number of work terminals may be two or more. In the present embodiment, two or more work terminals 30 are used in cooperation.

A configuration of the file management system 10 according to the present embodiment is the same as that of the first embodiment except for a terminal setting unit 114. The terminal setting unit 114 sets an ID for a plurality of work terminals. The terminal setting unit 114 is configured with software, for example, and is implemented by the arithmetic processing unit 12. The terminal setting unit 114 is recorded in the storage unit 11 in the same manner as other software, loaded into a memory (not illustrated) at the time of operation, and executed by the arithmetic processing unit 12.

A user sets the work terminal 31 and the work terminal 32 to be used from the management terminal 20 via the terminal setting unit 114. The work terminal 31 and the work terminal 32 are connected to the file management system 10 in a wired or wireless manner, and a name, an ID, and the like unique to each work terminal may be referred to from the management terminal 20 via the terminal setting unit 114, and the user can select a terminal to be used. The user sets a terminal to be used as a link source and a terminal to be used as a link destination. Description is given on the assumption that the work terminal 31 is registered as a terminal to be used as a link source and the work terminal 32 is registered as a terminal to be used as a link destination.

In a case where the work terminal 31 and the work terminal 32 are selected as terminals to be used from the management terminal 20, the write processing unit 112 writes, to the two terminals, document data to which link information is assigned. At this time, when a link source terminal and a link destination terminal are set, only document data serving as a link source may be written to the link source terminal, and only document data serving as a link destination may be written to the link destination terminal. Document data serving as a link source is document data of a type described in a "link source drawing type" row in the link rule illustrated in FIG. 8A. Similarly, document data serving as a link destination is document data of a type described in a "link destination drawing type" row.

Third Embodiment: Configuration of Work Terminal

Figure 18A:
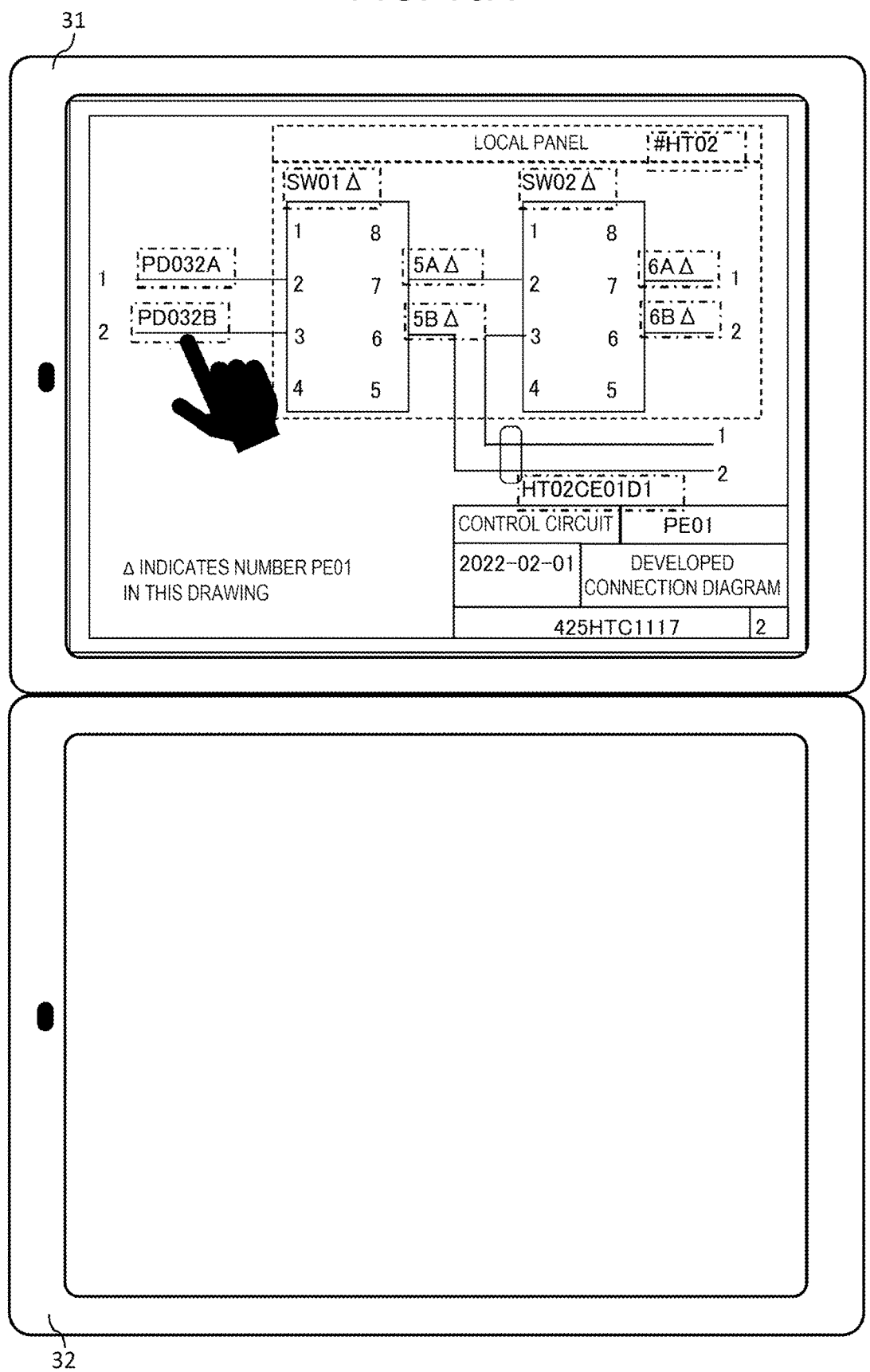
FIG. 18A illustrates a display example on a work terminal according to the third embodiment.
Figure 18B:
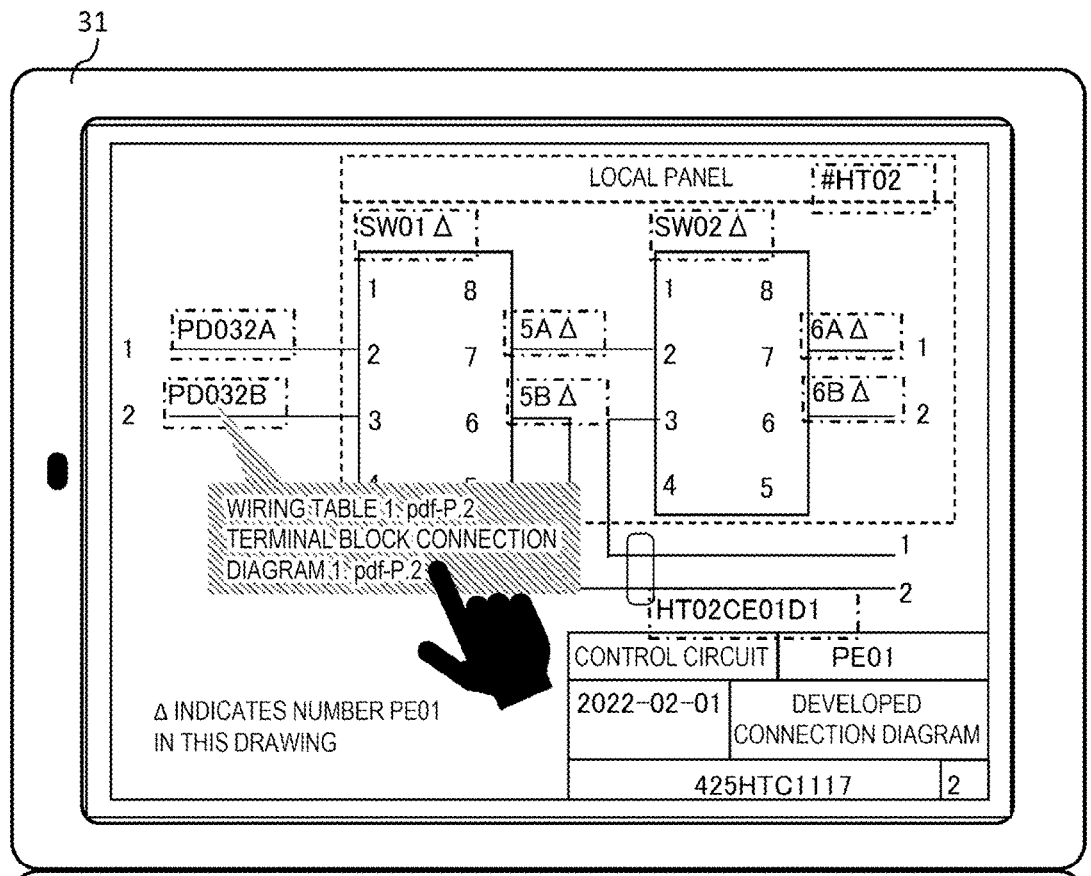
FIG. 18B illustrates a display example on the work terminal according to the third embodiment.

FIGS. 18A and 18B illustrate display examples on the work terminal according to the present embodiment. FIG. 18A is an example of a screen at a time point of start of work. A worker first starts the work using one of the terminals (in this example, the work terminal 31). At the time point of the start of the work, the work terminal 32 may display nothing or may display another screen.

When it is necessary to refer to another drawing, the worker touches a character string to which link information of a screen of the work terminal 31 is assigned. Thus, link destination candidates similar to those in FIG. 15B are displayed on the work terminal 31 as in FIG. 18B. In a case where a link destination displayed on the work terminal 31 is touched, the work terminal 32 displays a file and a page set as the link destination as illustrated in FIG. 18B.

When a character string to which link information is assigned is clicked on the work terminal 31 which is a link source terminal, an instruction to display a file and a page which are link destinations is transmitted to the work terminal 32 which is a link destination terminal. The work terminal 31 and the work terminal 32 may be directly connected by Bluetooth or Wi-Fi, or may be connected via the file management system 10.

Whether the work terminal 31 and the work terminal 32 become a link source terminal or a link destination terminal may be changed later by an operation from the work terminal 31 or the work terminal 32. In this case, it is necessary to write the same document data from the write processing unit 112 to the work terminal 31 and the work terminal 32 in advance.

According to the present third embodiment, a plurality of terminals can be used in cooperation with one another, and a plurality of pieces of related drawing data can be simultaneously browsed.

Regarding Modifications of Invention

The invention is not limited to the above-described embodiments and includes various modifications. For example, a part of a configuration of a certain embodiment can be replaced with a configuration of another embodiment, and a configuration of another embodiment can be added to a configuration according to a certain embodiment, without departing from the gist of the invention. In addition, another configuration can be added to, deleted from, or replaced with a part of a configuration of each embodiment.

In the above embodiments, data representing priority of a link destination may be embedded, for example, with a numerical value representing the priority as a part of link information, or may represent the priority by an arrangement order of link destination files described in the link information (in the order of "wiring table 1.pdf" and "terminal block connection diagram 1.pdf" in the example of FIG. 15B). The priority may be expressed in another appropriate format.

What is claimed is:

1. A file management system that manages a data file including a character string, the file management system comprising:
    a processor which when executing software configures the processor to:
    determine a type of a target indicated by the character string in accordance with a character type determination rule describing a rule for determining the type of the target based on the character string;
    compare a first character string included in a first data file with a second character string included in a second data file;
    acquire a link rule describing a rule for setting a link between the data files; and set a link between the first character string and the second data file in accordance with the link rule, wherein the link rule defines a link between the second data file and a type of a target indicated by the first character string, and the processor is further configured to:

specify the second data file as a link destination data file of the first character string in accordance with the link rule;

determine, by comparing a type of a target indicated by the second character string in the specified second data file with the type of the target indicated by the first character string, whether the target indicated by the first character string matches the target indicated by the second character string; and assign a link between the first character string and the second data file when the processor determines that the target indicated by the first character string matches the target indicated by the second character string.

2. The file management system according to claim 1, wherein the processor is further configured to:

determine a file type representing contents described in the data file, wherein the link rule defines a link among a file type of the first data file, the type of the target indicated by the first character string, and a file type of the second data file, and the processor is further configured to specify the second data file as the link destination data file of the first character string by referring to the link rule using the file type of the first data file determined by the processor and the type of the target indicated by the first character string determined by the processor.

3. The file management system according to claim 1, wherein the processor is further configured to determine the type of the target in accordance with at least one of the following:

a type of the character string;

the number of characters of the character string; and whether the character string includes another type of the character string, and when the character string includes another type of the character string, a position of the other type of the character string, and the processor is further configured to determine the type of the target by referring to the character type determination rule using the type of the character string and the number of characters of the character string.

4. The file management system according to claim 1, wherein the character type determination rule is configured to allow the type of the target to be determined based on a keyword included in the character string, and the processor is further configured to determine the type of the target by referring to the character type determination rule using the keyword in the character string.

5. The file management system according to claim 1, wherein the first data file in the link rule and the second data file in the link rule are drawing data describing the target from mutually different viewpoints.

6. The file management system according to claim 5, wherein the first data file in the link rule is drawing data describing an electrical connection relation between a component included in an electrical device and a wiring, and the second data file in the link rule is drawing data describing a physical arrangement of the component and the wiring, or a physical connection relation between the component and the wiring.

7. The file management system according to claim 1, wherein the first data file in the link rule is drawing data describing an overall image of a component included in an electrical device and a wiring, and the second data file in the link rule is drawing data describing a specific type of the component.

8. The file management system according to claim 1, wherein the link rule is configured to allow links to be set from the character string to two or more mutually different data files with mutually different priorities, and when links from the first data file to the two or more data files are included in the link rule, the processor is further configured to set links respectively from the first data file to the two or more data files and assign the priorities to the set links.

9. The file management system according to claim 1, wherein the link rule is configured to allow links to be set from the first data file to two or more mutually different data files with mutually different priorities, and when links from the first data file to two or more data files are included in the link rule, the processor is further configured to set a link to a data file having a highest priority among the two or more data files.

10. A work support system that supports work of a worker, comprising:

the file management system according to claim 1; and a first work terminal configured to acquire a data file managed by the file management system and present the data file to the worker.

11. The work support system according to claim 10, wherein the file management system is configured to perform at least one of the following:

associating two or more of the link rules with the single first data file, and managing two or more pairs of the first data file and the link rule, when there are two or more pairs, the first work terminal selects any one of the pairs and invalidates other pairs, and when two or more of the link rules are associated with the single first data file, the first work terminal leaves only one of the link rules and invalidates others.

12. The work support system according to claim 10, further comprising:

a second work terminal configured to acquire a data file managed by the file management system and present the data file to the worker, wherein the first work terminal acquires the first data file from the file management system, and the second work terminal acquires the second data file from the file management system, and the first work terminal and the second work terminal are configured such that the second work terminal displays the second data file when a link from the first data file to the second data file is selected in the first work terminal.

13. The work support system according to claim 10, further comprising:

a management terminal configured to be used by a user to operate the file management system, wherein the management terminal is configured to store the link rule into the file management system in accordance with an operation instruction from the user.

14. The work support system according to claim 10, further comprising:

a management terminal configured to be used by a user to operate the file management system, wherein the file management system is configured to manage two or more pairs of the first data file and the link rule, the management terminal instructs the file management system to reflect only one of the pairs as the link rule on the first data file, and the file management system reflects the link rule on the first data file in accordance with the instruction from the management terminal.

15. The work support system according to claim 12, further comprising:

a management terminal configured to be used by a user to operate the file management system, wherein the management terminal instructs the file management system to designate the first work terminal as a link source terminal of the first data file and designate the second work terminal as a link destination terminal of the first data file, and the file management system assigns the link to the first data file in accordance with the instruction from the management terminal.

* * * * *